US006926791B2

(12) United States Patent
Boss

(10) Patent No.: US 6,926,791 B2
(45) Date of Patent: Aug. 9, 2005

(54) METHOD FOR BINDING SHEET MEDIA

(75) Inventor: Roland Boss, Jalisco (MX)

(73) Assignee: Hewlett-Packard Development Company, L.P., Houston, TX (US)

( * ) Notice: Subject to any disclaimer, the term of this patent is extended or adjusted under 35 U.S.C. 154(b) by 347 days.

(21) Appl. No.: 10/360,475

(22) Filed: Feb. 5, 2003

(65) Prior Publication Data

US 2003/0116264 A1 Jun. 26, 2003

Related U.S. Application Data

(60) Division of application No. 09/866,017, filed on May 24, 2001, now Pat. No. 6,550,513, which is a continuation-in-part of application No. 09/482,124, filed on Jan. 11, 2000, now abandoned.

(51) Int. Cl.[7] ................................................ B32B 31/26

(52) U.S. Cl. ....................... 156/277; 156/290; 156/291; 156/311; 412/8; 412/900; 412/902; 270/58.08

(58) Field of Search ......................... 156/277, 290–291, 156/228, 282, 311, 324, 384, 498–499, 580–583.91, 908; 412/8, 22, 33, 37, 900, 902; 100/325–326, 209, 305; 281/21.1, 23; 270/58.08, 58.09

(56) References Cited

U.S. PATENT DOCUMENTS

| | | | | |
|---|---|---|---|---|
| 3,793,016 A | | 2/1974 | Eichorn | |
| 4,659,927 A | | 4/1987 | Tago et al. | |
| 4,795,524 A | | 1/1989 | Sakaida et al. | |
| 5,066,351 A | | 11/1991 | Knoll | |
| 5,213,560 A | | 5/1993 | Crowley | |
| 5,326,438 A | | 7/1994 | Crowley | |
| 5,328,438 A | * | 7/1994 | Crowley | 493/187 |
| 5,448,282 A | | 9/1995 | Imai et al. | |
| 5,456,646 A | | 10/1995 | Crowley | |
| 5,582,570 A | | 12/1996 | Crowley | |
| 5,733,406 A | | 3/1998 | Knight | |
| 5,863,377 A | | 1/1999 | Rohrbach | |

* cited by examiner

*Primary Examiner*—Jessica Rossi

(57) ABSTRACT

A method and apparatus for binding documents by individually binding each media sheet to previously bound media sheets using imaging material as the binding material.

7 Claims, 9 Drawing Sheets

METHOD FOR BINDING SHEET MEDIA

CROSS REFERENCE TO RELATED APPLICATIONS

This is a division of application Ser. No. 09/866,017 filed May 24, 2001 now U.S. Pat. No. 6,550,513 which is a continuation-in-part of application Ser. No. 09/482,124 filed Jan. 11, 2000, now abandoned.

FIELD OF THE INVENTION

This invention relates to an apparatus and method for binding media sheets. More particularly, the invention relates to an apparatus and method for producing a bound document from a plurality of media sheets by individually binding each media sheet to previously bound media sheets.

BACKGROUND

Current devices and methods for printing and binding media sheets involve printing the desired document on a plurality of media sheets, assembling the media sheets into a stack, and separately stapling, clamping, gluing and/or sewing the stack. In addition to imaging material used to print the document, each of these binding methods require separate binding materials, increasing the cost and complexity of binding. Techniques for binding media sheets using a common printing and binding material are known in the art. These techniques generally involve applying imaging material such as toner to defined binding regions on multiple sheets, assembling the media sheets into a stack, and reactivating the imaging material, causing the media sheets to adhere to one another. These known devices and methods, however, can consume significantly more time than producing an unbound document. Each involves printing the entire or a substantial portion of the desired document, then assembling and aligning the media sheets into a stack in preparation to be bound. Binding the stack of media sheets also entails applying sufficient heat to the binding region to reactivate the imaging material throughout multiple sheets or throughout the entire stack. Consequently, the thickness of the bound document is limited by the device's ability to adequately heat the binding regions throughout multiple sheets or the stack without damaging the media sheets.

SUMMARY

U.S. patent application Ser. No. 09/482,124 filed Jan. 11, 2000 (the '124 application), incorporated herein by reference in its entirety, describes new techniques for binding documents by individually binding each media sheet to previously bound media sheets using imaging material as the binding material. In one technique for page by page binding described in the '124 application, heat and pressure are applied to each sheet as it is added to the stack to reactivate the toner or other imaging material used as the binding agent. The rate at which sheets can be successively bound to the stack depends in part on how fast the imaging material can be melted and then cured in the binding process. It is desirable, therefore, when using this type of page by page binding technique to cycle between heating/melting the imaging material and cooling/curing the imaging material and to complete the cycle as fast as possible.

Accordingly, the present invention is directed to a method and apparatus for binding together a plurality of media sheets by successively heating and then actively cooling the imaging material binding agent on each sheet as the sheet is added to the stack. In one embodiment of the invention, a method for binding together a plurality of media sheets includes: applying imaging material to a binding region on a single media sheet and activating the imaging material; collecting the sheet together with previously collected sheets in a stack; heating the imaging material applied to the binding region of the sheet; cooling the imaging material applied to the binding region of the sheet; and repeating the acts of applying, collecting, heating and cooling for each sheet in the plurality of sheets. In another embodiment, an apparatus for binding media sheets having a region of imaging material applied thereto for binding includes a tray for collecting a plurality of media sheets and heating and cooling elements. The heating and cooling elements are movable, for each sheet output to the tray, between a first position in which a sheet in the tray is heated and a second position in which the sheet is cooled.

DETAILED DESCRIPTION OF THE INVENTION

Figure 1:
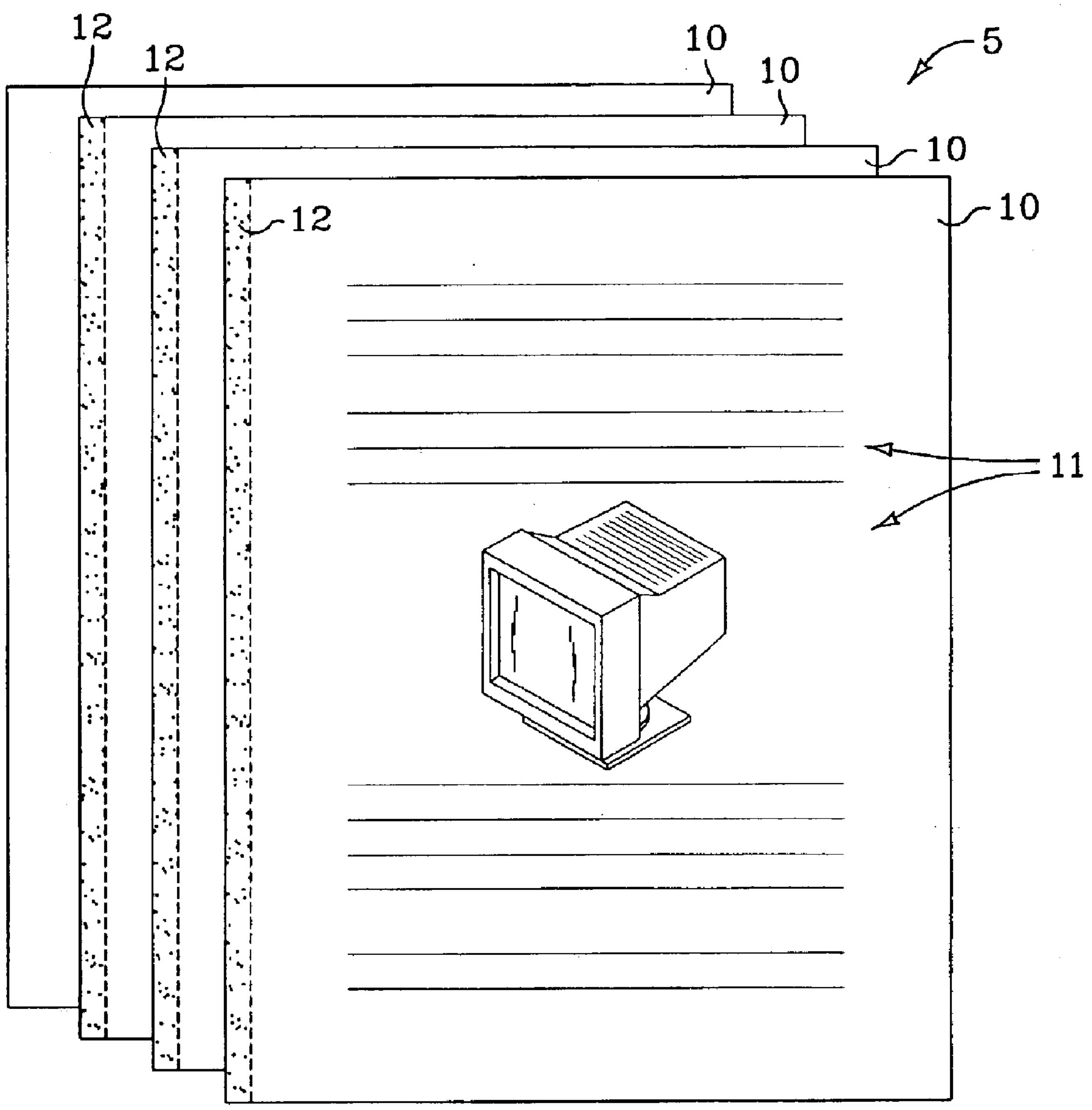
FIG. 1 is a plan view of multiple media sheets that will be bound in to a document showing the toner binding region along the left edge of each sheet.

FIG. 1 shows multiple media sheets used to form a document 5, each media sheet generally referenced as 10. Document 5 includes multiple print images 11. Each print image 11 represents a page of document 5 and may include text and/or graphics. Each media sheet 10 may have a print image 11 applied to one or both sides. For example, a ten page document, composed of ten print images, may be produced on five media sheets, one print image on each side. Each media sheet 10 also includes imaging material, such as toner, applied to one or more selected binding regions 12. Binding region 12 usually will be located along one edge of media sheet 10 on one or both sides. Preferably, binding region 12 is applied to only the bottom side of each sheet in which case it is not necessary to apply imaging material to a binding region on the first/bottom sheet. The dotted lines along binding regions 12 in the Figures indicate the imaging material has been applied to the bottom side of the sheet.

Figure 2:
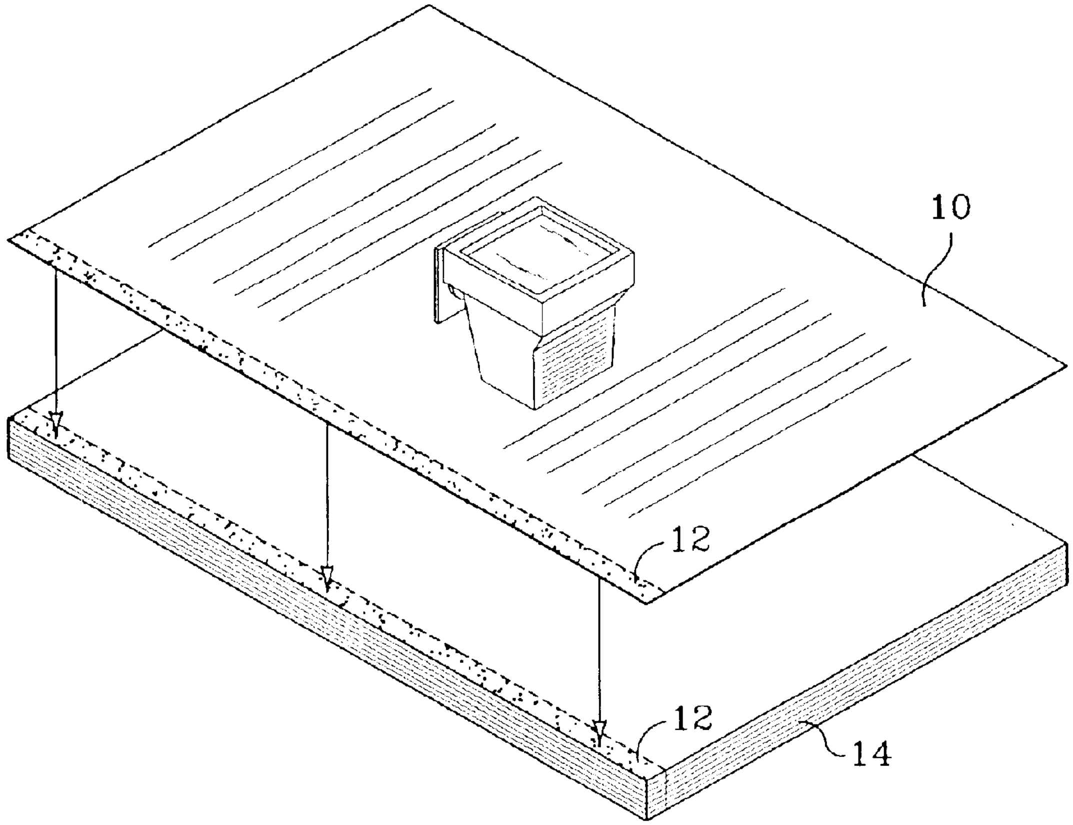
FIG. 2 is a perspective view of sheets being bound into a document showing a single sheet positioned over a stack of sheets that have already been bound together.

Referring now to FIG. 2, document 5 is formed by individually binding each sheet 10 one after another to the stack 14. As each sheet 10 is output to the stack 14, binding region 12 is aligned with the binding region of the sheets in stack 14 and the imaging material applied to binding region 12 is reactivated to fuse and thereby bind sheet 10 to stack 14. The strength of the inter-sheet bond is a function of the type, area, density, and degree of reactivation of the imaging material applied to binding region 12 of each media sheet 10. By varying these parameters the inter-sheet bond can be made very strong to firmly bind the document or less strong to allow easy separation. It is expected that the imaging material will usually be reactivated by applying heat and pressure. A variety of other reactivation techniques that may be used are described in my copending application Ser. No. 09/320,060, titled Binding Sheet Media Using Imaging Material, which is incorporated herein by reference in its entirety. This may be accomplished by direct application of heat as described above, or ultrasound, magnetic energy, radio frequency energy and other forms of electromagnetic energy. It is possible to use toner which re-activates upon application of pressure. The toner used for binding may include magnetic ink or otherwise may have a quality of reacting to electromagnetic, optical or actinic energy (infrared, visible or ultraviolet). The ability to react to energy may be in the form of heat conversion or chemical reaction. The ability to react to energy enhances the ability of re-activating without burning the paper or otherwise damaging the sheets. Hence, pressing a heating element against the stack is just one structure that may be used to carry out the method of the invention.

Figure 3:
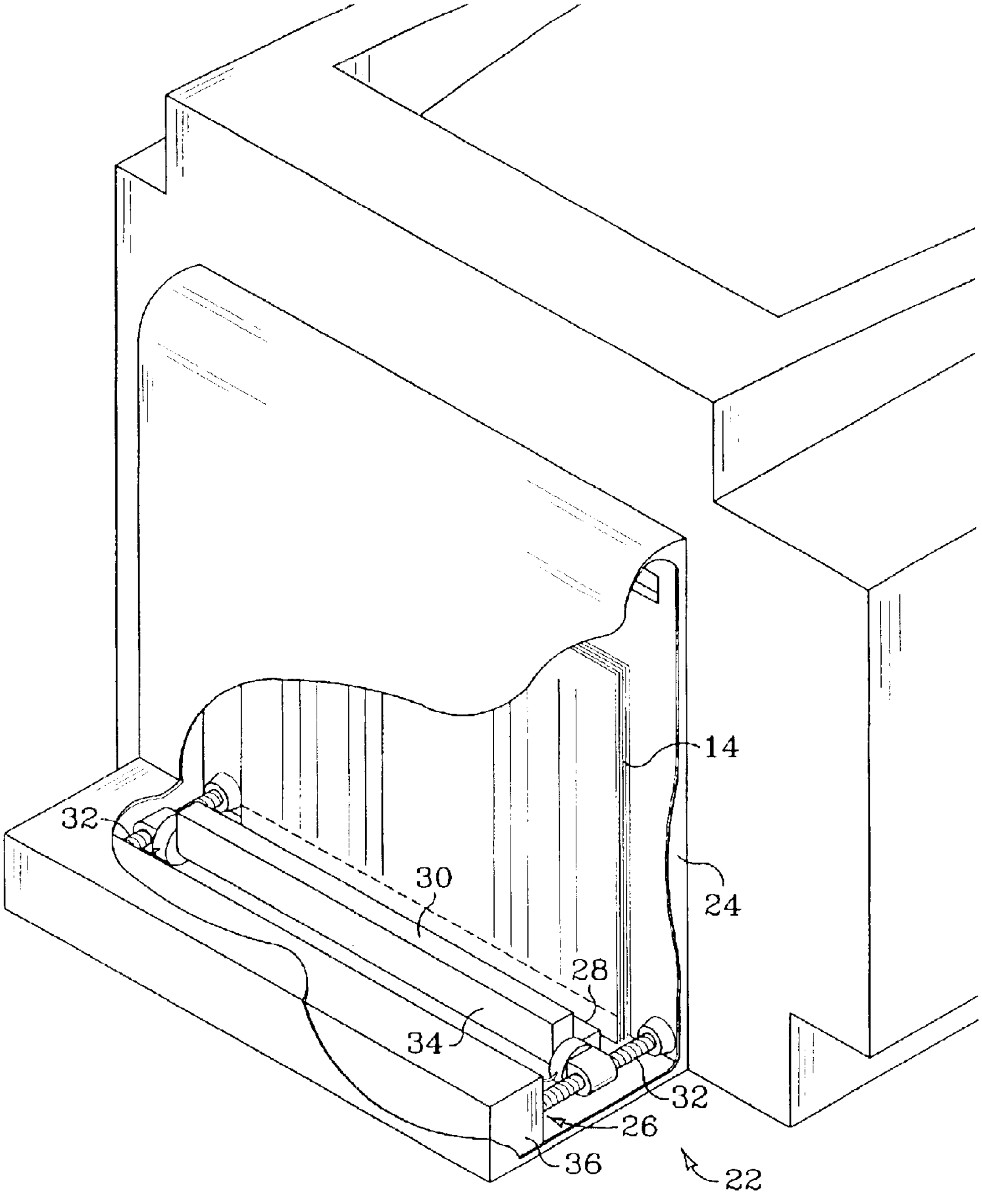
FIG. 3 is a perspective view of a binding device constructed according to one embodiment of the invention in which the binder uses a pair of rotating heating and cooling elements.
Figure 4:
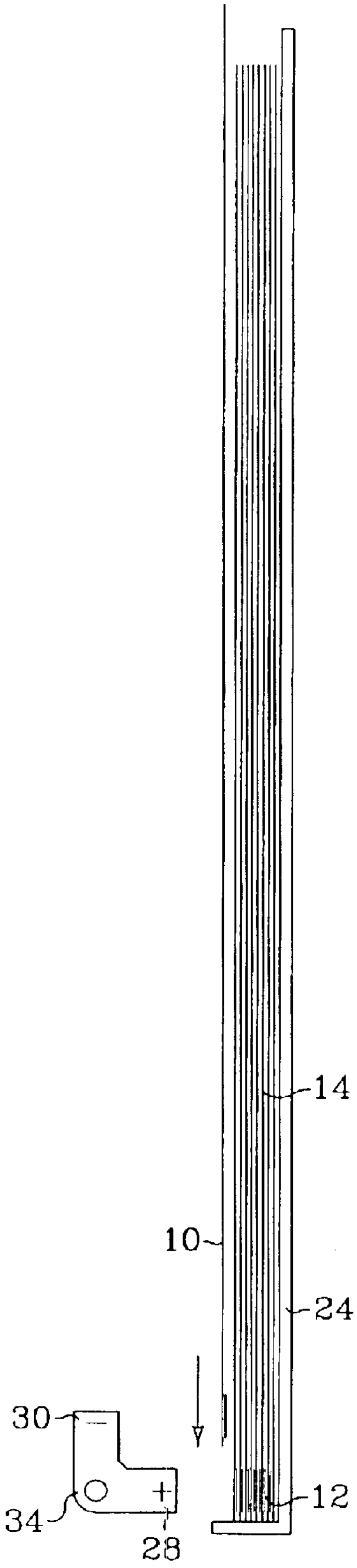
FIGS. 4–9 are sequential cross section views of the binding device of FIG. 3 showing an individual media sheet being bound to a previously bound stack of sheets.
Figure 5:
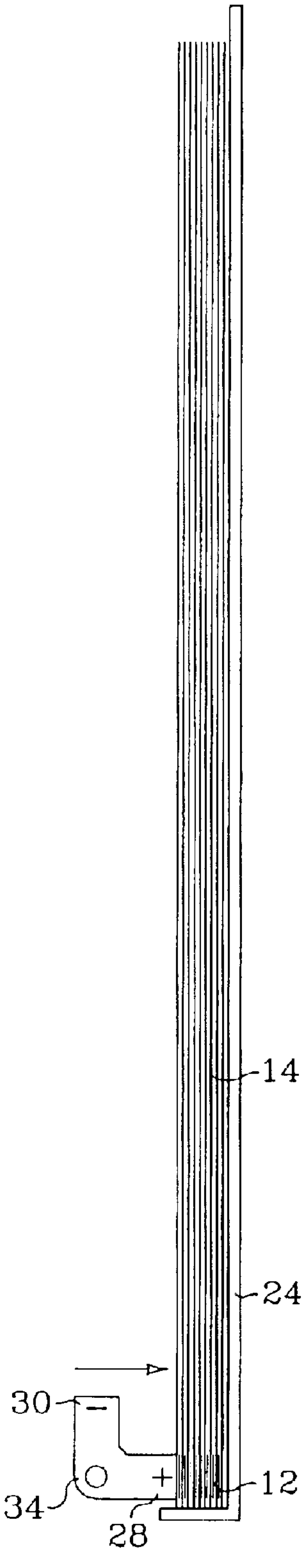

FIG. 3 illustrates a binding apparatus 22 constructed according to one embodiment of the invention. Referring to FIG. 3, binding apparatus 22 includes a sheet collecting tray 24, press 26, heating element 28 and cooling element 30. Press 26 represents generally any suitable mechanism for pressing the heating and cooling elements 28 and 30 against stack 14. In the embodiment shown in FIG. 3, press 26 includes lead screws 32 and carriage 34. Carriage 34, which supports heating element 28 and cooling element 30, travels up and down or back and forth along lead screws 32. Heating and cooling elements 28 and 30 may be integral to carriage 34 or constructed as discrete components. A stepper motor 36 or other suitable drive mechanism rotates lead screws 32 to move carriage 34. Depending upon the direction of rotation, lead screws 32 either urge carriage 34 and heating and cooling elements 28 and 30 toward or away from stack 14.

Heating element 28 is, preferably, a hot platen through which pressure and heat can be applied to binding region 12 on sheets 10. Cooling element 30 is, preferably, a cool platen through which pressure and cooling can be applied to binding region 12 of sheets 10. Heating platen 28 and cooling platen 30 extend substantially the full length of binding region 12 on sheets 10.

The operation of binder 22 will now be described with reference to the section view of binder 22 in FIGS. 4–9. Each sheet 10 is output from the printer, copier, fax machine or other image forming device into tray 24. Sheet 10 is aligned to the stack 14 as may be necessary or desirable using conventional techniques. As each sheet 10 is brought into alignment with the stack, lead screws 32 rotate to move carriage 34 toward tray 24 and press heating platen 28 against top sheet 10 and stack 14 along binding region 12, as seen by comparing FIGS. 4 and 5. The heat and pressure applied to binding region 12 of sheet 10 reactivates the imaging material (melts the toner) in region 12.

Figure 6:
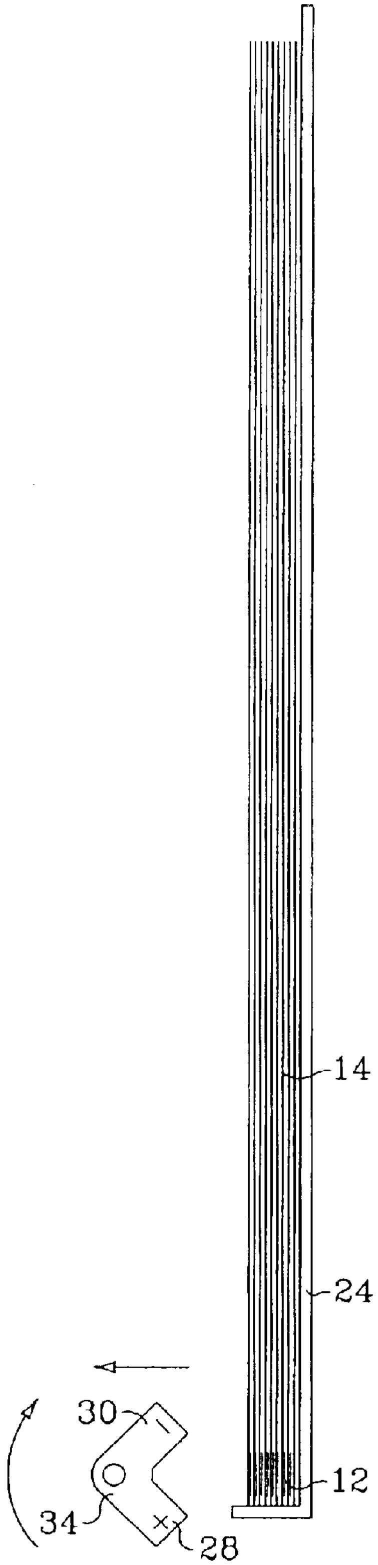
Figures 7, 8, 9:
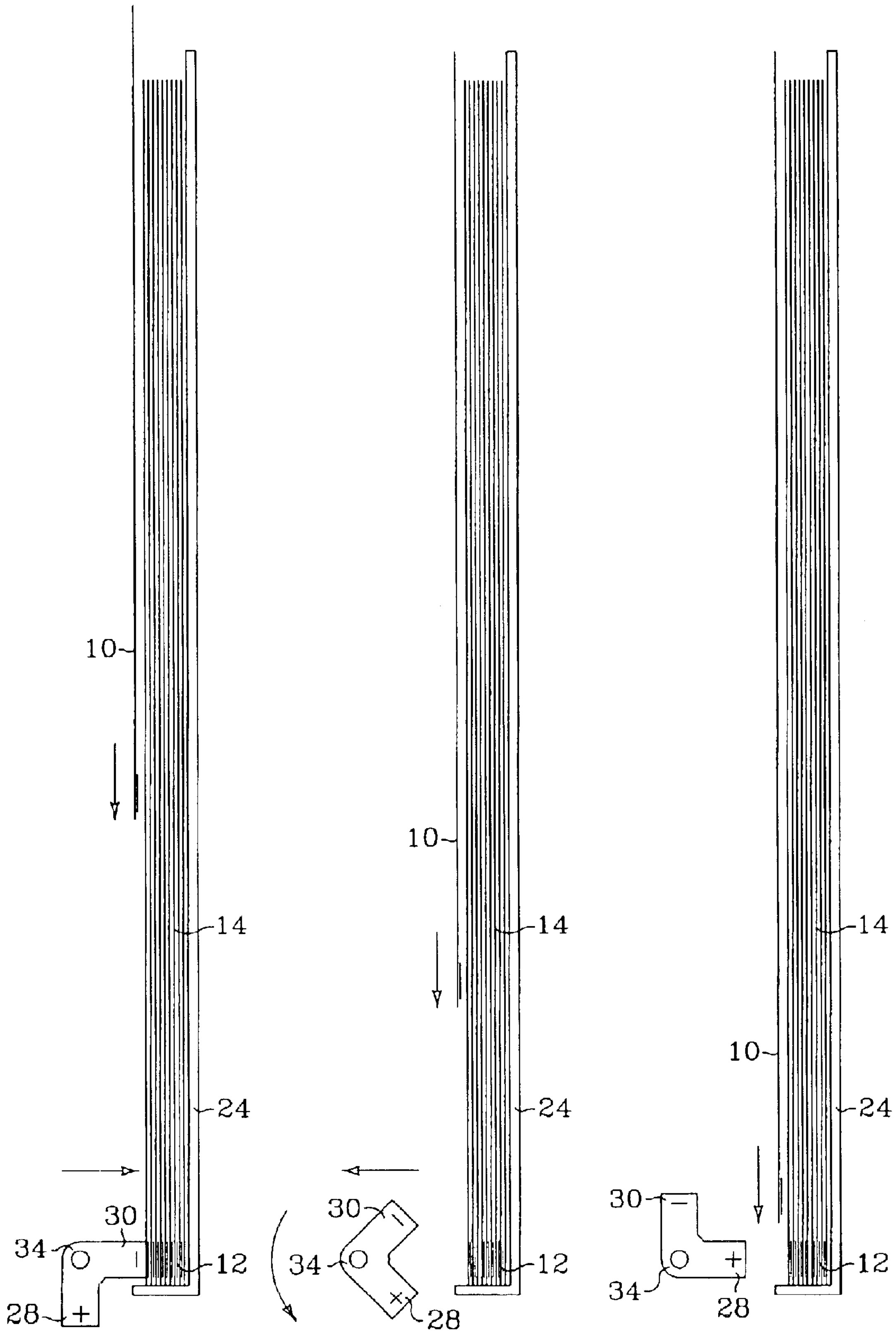

The direction of rotation of lead screws 32 is reversed to move carriage 34 away from tray 24 and separate hot platen 28 from stack 14 as shown in FIG. 6. Simultaneously with or immediately after carriage 32 is moved away from tray 24, carriage 32 is rotated clockwise to bring cooling platen 30 into alignment with binding region 12 of sheet 10 and stack 14, as shown in FIGS. 6 and 7. If heating and cooling platens 28 and 30 are constructed as discrete components, platens 28 and 30 may rotate relative to carriage 34 rather than rotating with carriage 34. In either case, what is important is that cooling platen 30 be brought into alignment with binding region 12 for the next step in the binding process. Once cooling platen 30 is aligned with binding region 12, or simultaneously with the step of rotating cooling platen 30 into alignment, lead screws are reversed again to move carriage 34 toward tray 24 and press cooling platen 30 against top sheet 10 and stack 14 along binding region 12, as shown in FIG. 7. Press 26 is held momentarily in this position to maintain pressure on sheet 10 and stack 14 as the imaging material cools. The cooling combined with the continuing compression of media sheet 10 and stack 14 allows the reactivated imaging material (melted toner) to cure.

The direction of rotation of lead screws 32 is reversed to move carriage 34 away from tray 24 and separate cooling platen 30 from stack 14. Carriage 34 is rotated, preferably counter-clockwise, to bring heating platen 28 back into alignment with binding region 12 in preparation for binding the next sheet 10 added to stack 14, as shown in FIGS. 8 and 9.

Figure 10:
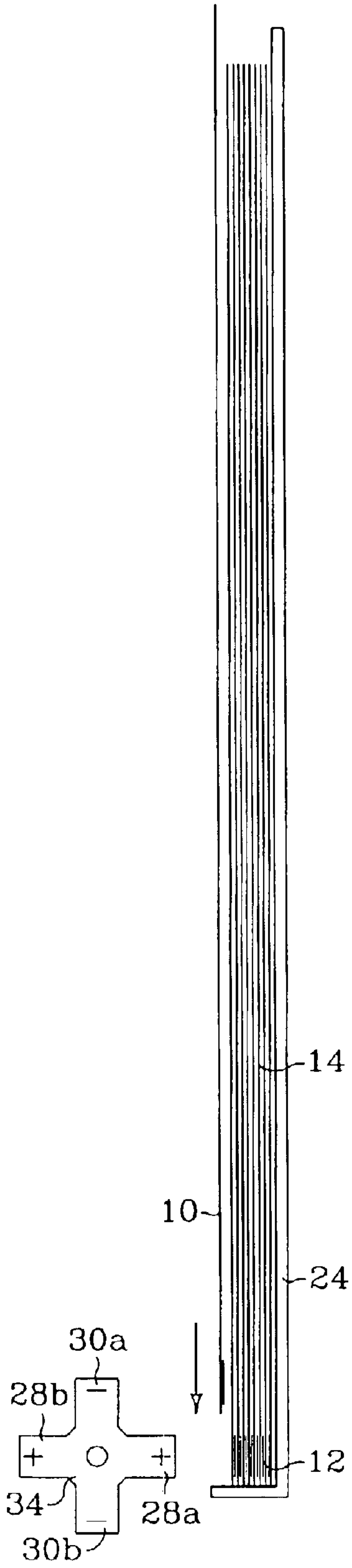
FIGS. 10–15 are sequential cross section views of a binding device constructed according to a second embodiment of the invention in which the binder uses two pair of rotating heating and cooling elements.
Figure 11:
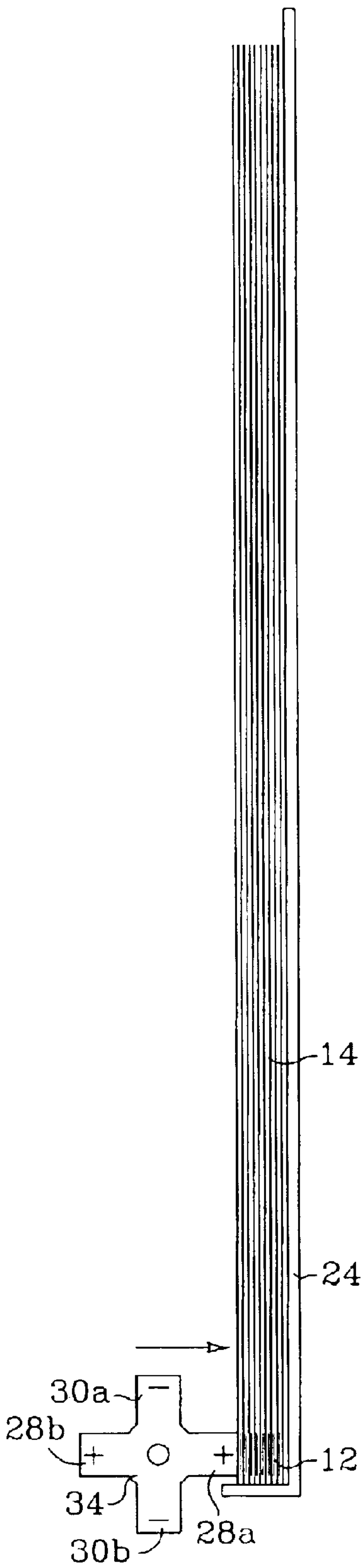
Figure 12:
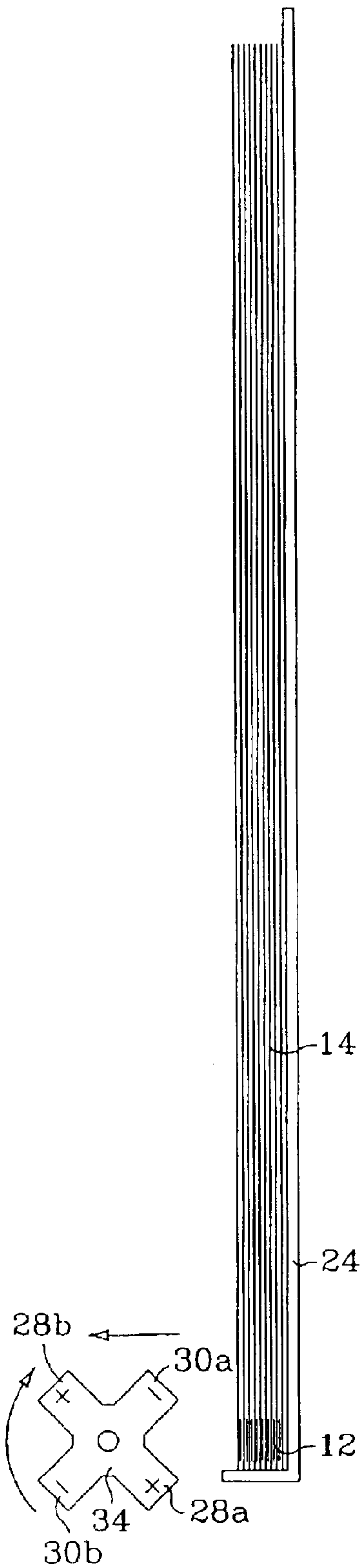
Figure 13:
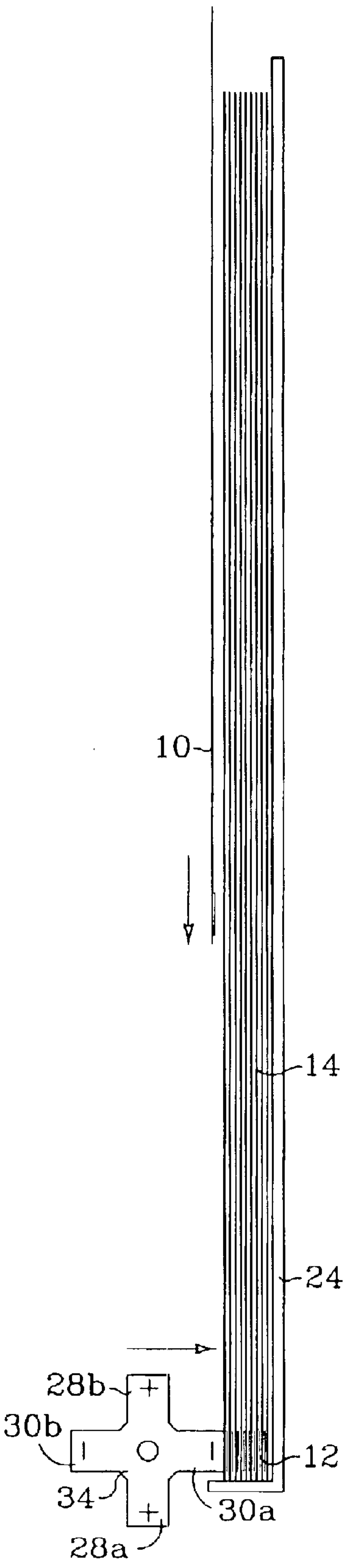
Figure 14:
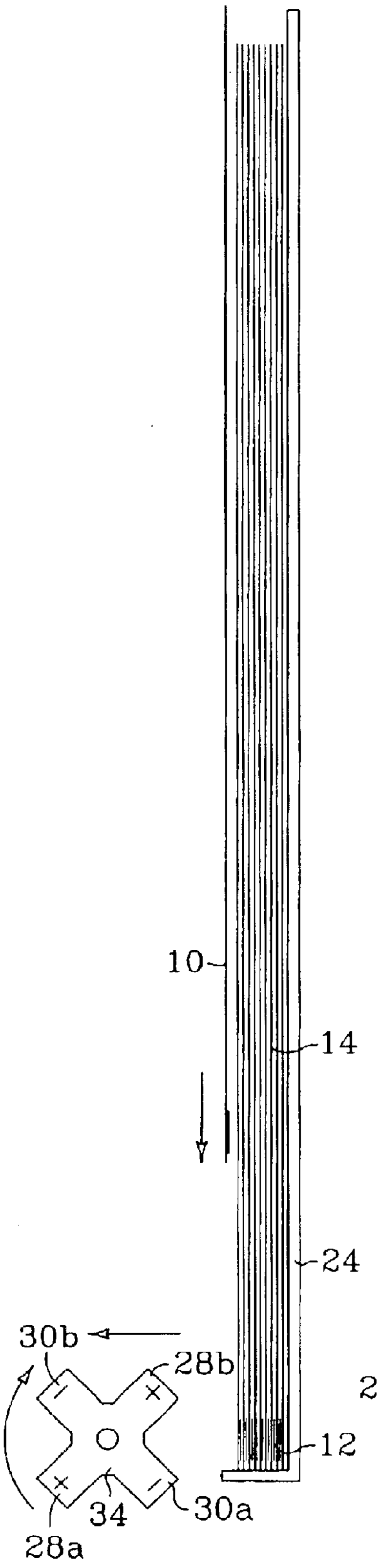
Figure 15:
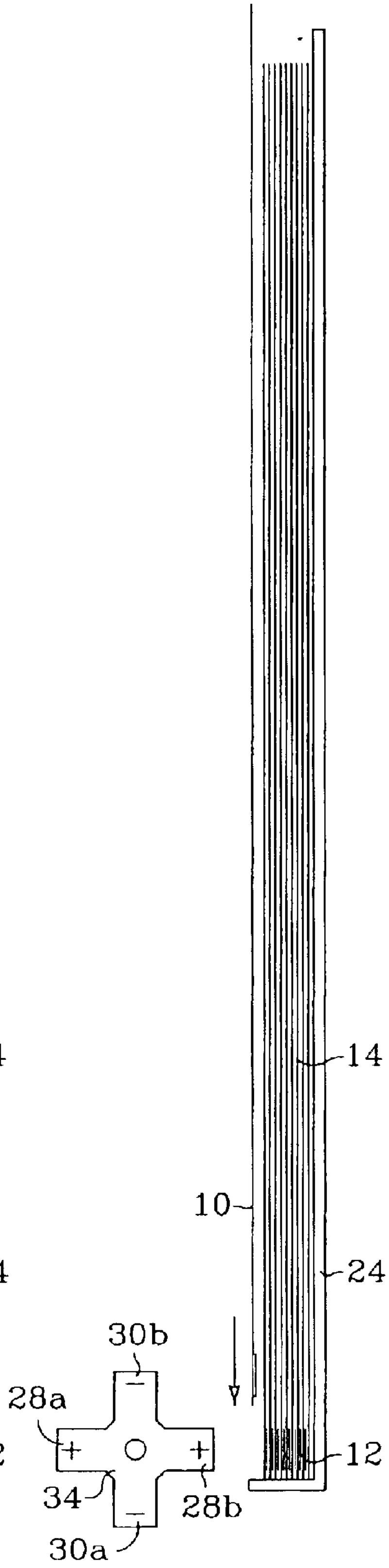

In an alternative embodiment illustrated in FIGS. 10–15, a four platen system is used. In this embodiment, two sets of heating and cooling platens **28*a*, 28*b* and 30*a*, 30*b* rotate in the same direction through their respective operative positions facing stack 14. FIGS. 10 and 11 show first heating platen 28*a* aligned with and then pressed against top sheet 10 and stack 14 along binding region 12. Then, as shown in FIGS. 12 and 13, first cooling platen 30*a* is rotated clockwise into alignment and pressed against top sheet 10 and stack 14. Second heating platen 28*b* is then rotated clockwise into alignment with binding region 12 in preparation for binding the next sheet 10 added to stack 14, as shown in FIGS. 14 and 15. This procedure is repeated alternately cycling between the first set of platens 28*a* and 30*a* and the second set of platens 28*b* and 30*b* for successive sheets 10**.

Figure 16:
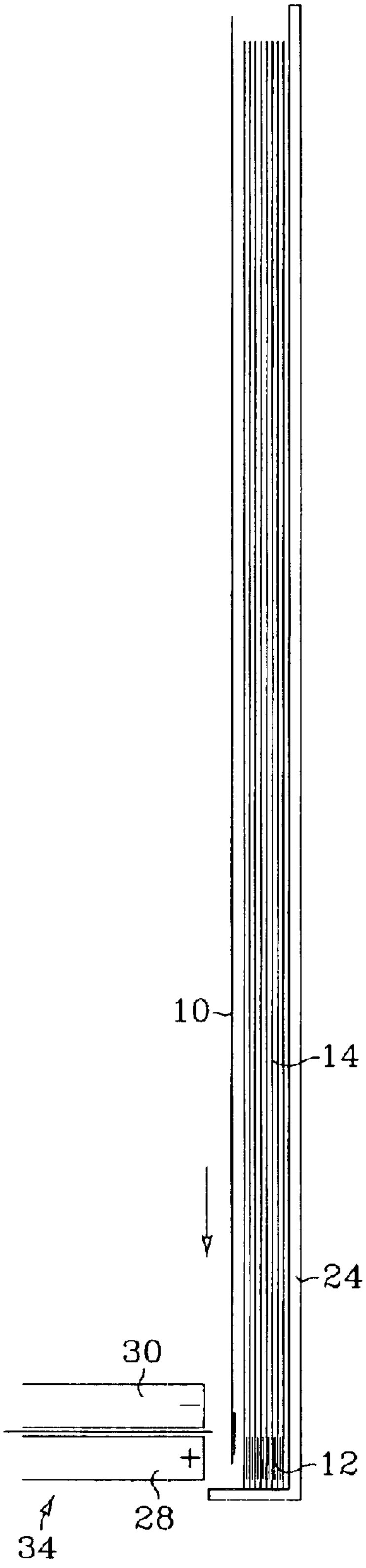
FIGS. 16–18 are sequential cross section views of a binding device constructed to a third embodiment of the invention in which the binder uses a pair of sliding heating and cooling elements.
Figure 17:
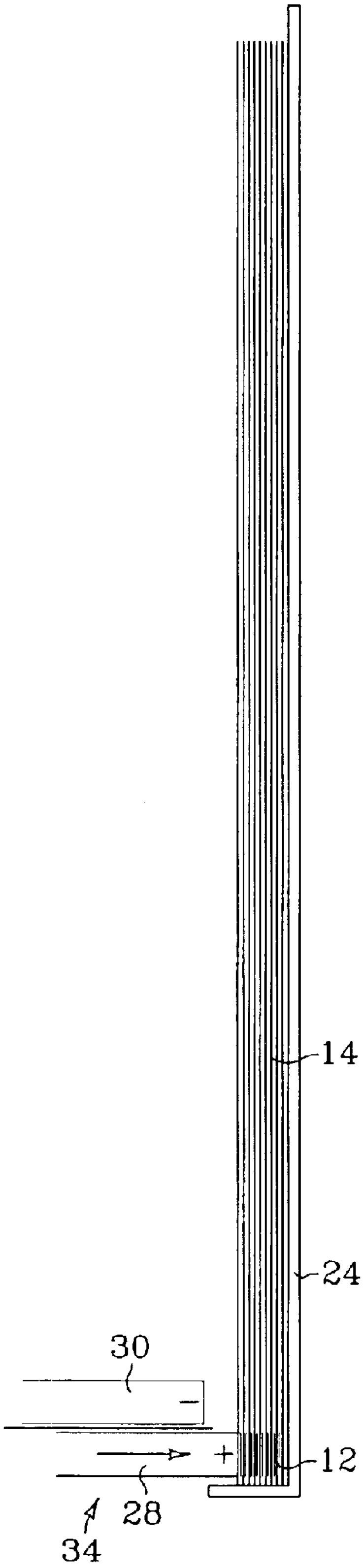
Figure 18:
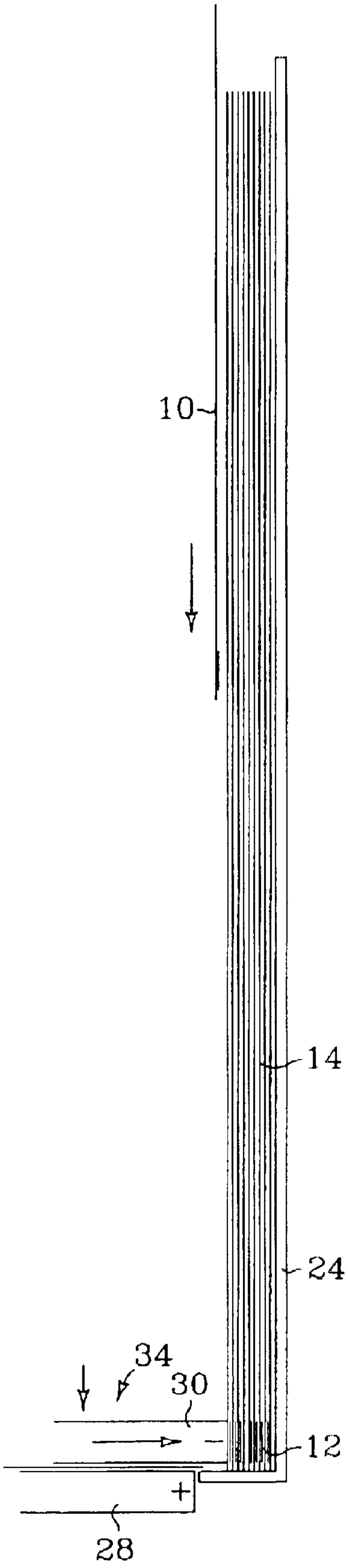

In another embodiment illustrated in FIGS. 16–18, heating and cooling platens 28 and 30 do not rotate. That is to say, heating and cooling platens 28 and 30 are rotationally stationary. In this embodiment, platens 28 and 30 move along stack 14 for proper alignment and slide into and away from stack 14 to reactivate the imaging material binding agent. Referring to FIG. 16, heating platen 28 is aligned with binding region 12 of the sheets in stack 14 as new sheet 10 is output to tray 24. Then, heating platen 28 is pressed against top sheet 10 and stack 14 along binding region 12, as shown in FIG. 17. Heating platen 28 is then withdrawn, the platens are indexed linearly down to bring cooling platen 30 into alignment with binding region 12 of sheet 10 and stack 14 and cooling platen 30 is pressed against top sheet 10 and stack 14, as shown in FIG. 18. Cooling platen 30 is withdrawn, the platens are indexed up to bring heating platen 28 into alignment for the next sheet 10 as shown in FIG. 16 and the cycle is repeated for each new sheet added to the stack.

Figure 19:
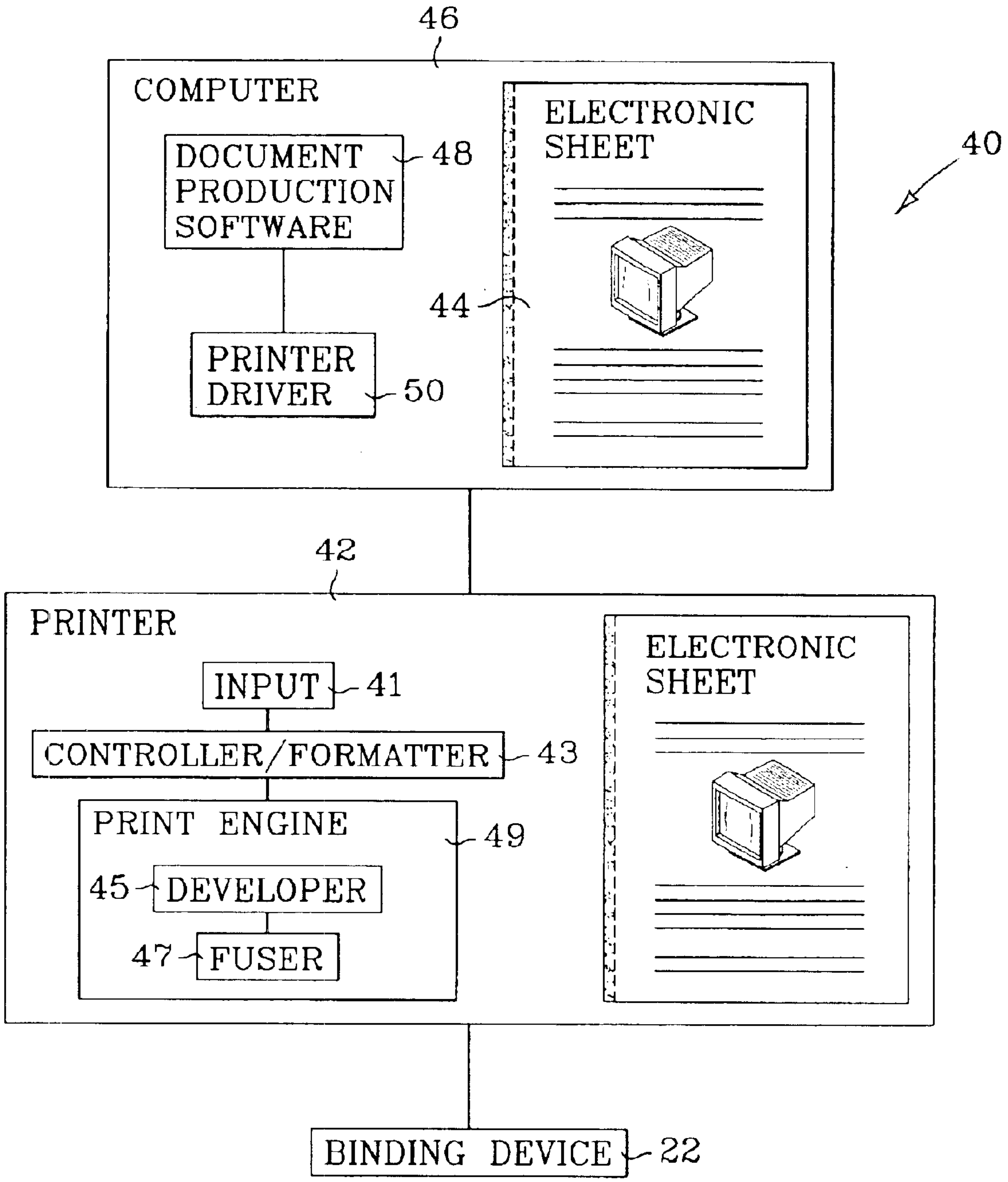
FIG. 19 is a block diagram representing a system for creating, printing and binding a bound document.

Referring now to the block diagram of FIG. 19, this embodiment of the invention is directed to a system for printing and binding the document, the system generally referenced as 40. In addition to the components of the various embodiments of binder 22 described above, system 40 also includes an image forming device 42 such as a laser printer, a copier or a facsimile machine. Image forming device 42 is electronically coupled to a computer 46. Computer 46 may be programmed to generate and/or retrieve a desired print image in electronic form 44 and to transmit electronic document 44 to image forming device 42 instructing image forming device 42 to create the desired print image on media sheet 10. This programming may generally be accomplished by document production software 48 in combination with a printer driver 50. However, system 40 does not necessarily require computer 46. Instead, image forming device 42 may itself perform the functions of computer 46. A digital copier, for example, generates and stores the electronic document itself for subsequent transmission to the print engine where the electronic image is developed into the printed image.

Software 48 electronically creates and/or retrieves desired document 44. Upon receiving a print command, software 48 transmits electronic data representing desired document 44 to printer driver 50. Printer driver 50 compiles the electronic data into a form readable by image forming device 32, generally breaking the electronic data representing desired document 44 into a plurality of separate print images, each representing a page of desired document 44. Software 48 and/or printer driver 50 may also define binding region 12 for each media sheet 10 to be transmitted along with or as part of each print image. Alternatively, binding region 12 may be defined by image forming device 42 or by another suitable mechanism. For each media sheet 10 used to form desired document 44, image forming device 42 applies imaging material in the pattern of the desired print image on one or both sides of media sheet 10. Image forming device 42 may also apply imaging material to defined binding region 12 located on one or both sides of media sheet 10. Image forming device 42 activates the imaging material (fuses the toner if laser toner is used) and outputs media sheet 10 to binder 22.

Image forming device 42 is depicted as a laser printer in FIG. 19. Although it is expected that the binding techniques of the present invention will be most often used with and embodied in electrophotographic printing devices such as the laser printer illustrated in FIG. 19, these techniques could be used with and embodied in various other types of image forming devices. Referring again to FIG. 19, document production software 48 and printer driver 50 transmit data representing the desired print image and binding regions to input 41 on laser printer 42. The data is analyzed in the printer's controller/formatter 43, which typically consists of a microprocessor and related programmable memory and page buffer. Controller/formatter 43 formulates and stores an electronic representation of each page that is to be printed, including the print image and the binding regions. In addition to formatting the data received from input 41, controller/formatter 43 drives and controls the toner development unit 45, fuser 47 and other components of print engine 49.

The present invention has been shown and described with reference to the foregoing exemplary embodiments. Other embodiments are possible. For example, translationally stationary platens located close the stack 14 could be used to apply pressure to stack 14 as each platen rotates into position against the binding region 12 of each new sheet 10. It is to be understood, therefore, that other forms, details, and embodiments may be made without departing from the spirit and scope of the invention which is defined in the following claims.

What is claimed is:

1. A method for binding together a plurality of media sheets, comprising:

applying imaging material to a binding region on a single media sheet and activating the imaging material;

collecting the sheet together with previously collected sheets in a stack;

heating the imaging material applied to the binding region of the sheet;

cooling the imaging material applied to the binding region of the sheet; and repeating the acts of applying, collecting, heating and cooling for each sheet in the plurality of media sheets.

2. The method according to claim 1, further comprising pressing the binding region of the sheet against the other sheets in the stack simultaneously with the act of heating the imaging material applied to the binding region.

3. The method according to claim 1, further comprising pressing the binding region of the sheet against the other sheets in the stack simultaneously with the acts of heating and cooling the imaging material applied to the binding region.

4. A method for binding together a plurality of media sheets, comprising:

applying imaging material to a binding region on a single media sheet and activating the imaging material;

collecting the sheet together with previously collected sheets in a stack;

pressing a heating element against the binding region of the sheet;

withdrawing the heating element from the sheet;

pressing a cooling element against the binding region of the sheet;

withdrawing the cooling element from the sheet; and repeating the acts of applying, collecting, pressing, the heating element withdrawing, the heating element pressing and the cooling element withdrawing the cooling element for each sheet in the plurality of media sheets.

5. The method according to claim 4, further comprising simultaneously moving the heating element linearly out of alignment with the binding region of the sheet and moving the cooling element linearly into alignment with the binding region of the sheet.

6. The method according to claim 4, further comprising simultaneously rotating the heating element out of alignment with the binding region of the sheet and rotating the cooling element into alignment with the binding region of the sheet.

7. The method according to claim 6, wherein the acts of heating and cooling elements are rotated after the heating element is withdrawn from the sheet.

* * * * *